(No Model.)

S. V. THOMAS.
CUFF FASTENER.

No. 344,605. Patented June 29, 1886.

WITNESSES:
Fred. G. Dieterich
Edw. W. Byrn

INVENTOR:
S. V. Thomas
BY Munn & Co
ATTORNEYS.

N. PETERS, Photo-Lithographer, Washington, D. C.

UNITED STATES PATENT OFFICE.

STEPHEN V. THOMAS, OF WEST BRANCH, MICHIGAN.

CUFF-FASTENER.

SPECIFICATION forming part of Letters Patent No. 344,605, dated June 29, 1886.

Application filed April 23, 1886. Serial No. 199,965. (No model.)

*To all whom it may concern:*

Be it known that I, STEPHEN V. THOMAS, of West Branch, in the county of Ogemaw and State of Michigan, have invented a new and useful Improvement in Cuff-Fasteners, of which the following is a specification.

My invention relates to a fastener or retaining device for connecting a cuff to the shirt-sleeve with facility and at any point on the sleeve, higher up or lower down, as may be required, the same being designed to take the place of the cuff-button.

It consists in a fastener made of spring-wire and in a single piece, and of a peculiarly-bent construction, which I will now proceed to describe.

Figure 1:
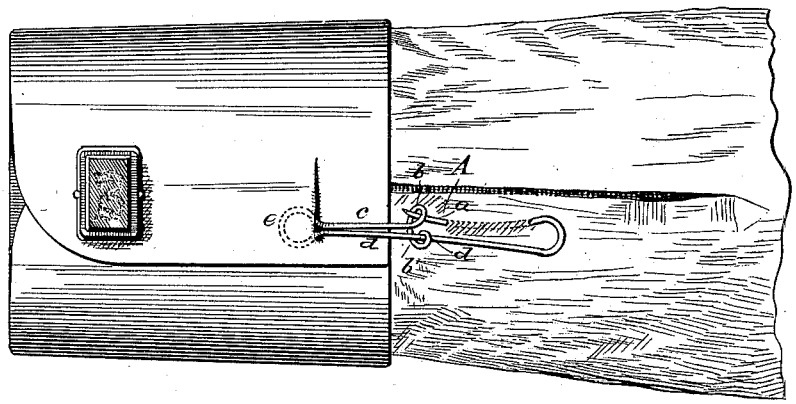
Figure 2:
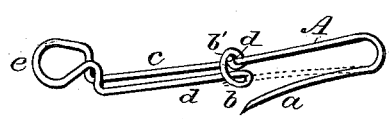

Figure 1 is a side view of the fastener shown applied to a shirt-sleeve and cuff, and Fig. 2 is a perspective view of the fastener.

In the drawings, A represents the fastener, which is made of one piece of spring-wire, one end of which is bent to form a pointed hook, *a*, and the other end, *d*, of which is bent to form a double loop, *b b'*, one of which, *b*, forms a keeper for the pointed end of the hook to catch into after the manner of a safety-pin, and the other loop, *b'*, of which embraces and strengthens the main stem. From this point the main stem *c* and end *d* extend a short distance in parallel position and then terminate in an offsetting loop or eye, *e*, in which the main stem and end *d* run or extend the one into the other. This offsetting loop or eye *e* forms a sort of button, which is inserted into the button-holes of the cuff, while the pointed hook is pinned into the shirt-sleeve and then fastened by being inserted in the keeper-loop *b*, like a safety-pin.

I am aware that cuff-holders bearing a certain degree of resemblance to mine have been heretofore constructed—such, for instance, as those shown in Patents Nos. 323,449 and 229,324—and I only claim my peculiar construction shown, which is distinctive in the peculiar construction of holder as bent out of a single piece of wire.

Having thus described my invention, what I claim as new is—

The cuff-holder herein described, consisting of the pointed hook *a*, the main stem *c*, and end *d*, bent to form an offsetting loop or eye, *e*, the said end *d* being also bent into the double loop *b b'*, one of which forms a keeper for the point of the hook, and the other of which embraces and holds the main stem, substantially as shown and described.

STEPHEN V. THOMAS.

Witnesses:
JOHN TOLFREE,
FRANK G. BELL.